(12) United States Patent
Eriksson

(10) Patent No.: US 8,360,233 B2
(45) Date of Patent: Jan. 29, 2013

(54) ADJUSTMENT DEVICE FOR THE ADJUSTMENT OF BELTS OF BELT CONVEYORS

(75) Inventor: Håkan Nils Eriksson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 168 days.

(21) Appl. No.: 12/993,753

(22) PCT Filed: May 20, 2009

(86) PCT No.: PCT/SE2009/000266
§ 371 (c)(1),
(2), (4) Date: Feb. 10, 2011

(87) PCT Pub. No.: WO2009/142570
PCT Pub. Date: Nov. 26, 2009

(65) Prior Publication Data
US 2011/0127145 A1     Jun. 2, 2011

(30) Foreign Application Priority Data
May 21, 2008    (SE) ...................................... 0801172

(51) Int. Cl.
*B65G 39/16*    (2006.01)
*B65G 15/64*    (2006.01)

(52) U.S. Cl. .................. 198/806; 198/807; 198/810.04; 226/21

(58) Field of Classification Search .................. 198/806, 198/807, 810.03, 810.04, 813, 825, 837, 198/842; 226/18, 21
See application file for complete search history.

(56) References Cited

U.S. PATENT DOCUMENTS 3,368,665 A * 2/1968 Jinkins ........................ 198/806
(Continued)

FOREIGN PATENT DOCUMENTS

| CN | 2808831 | 8/2006 |
|---|---|---|
| DE | 3033578 | 4/1982 |

(Continued)

OTHER PUBLICATIONS

Search Report dated Sep. 2, 2009 for International Application No. PCT/SE2009/000266 filed May 20, 2009.

(Continued)

*Primary Examiner* — Douglas Hess
(74) *Attorney, Agent, or Firm* — Morgan, Lewis & Bockius LLP

(57) ABSTRACT

This invention relates to a adjustment device intended for the adjustment of belts of belt conveyors and of the type that comprises a roller that is rotatable around a first axis (CR) and mounted in a cradle, which in turn is turnably mounted in a supporting stand, and, by a force generator, tiltable in relation to the stand around a second axis (CT) extending perpendicularly to the first one. According to the invention, the adjustment device comprises a transmission actuator in the form of a carriage having two guide elements, which slope in different directions. When the force generator generates a force having a first principal force component, the transmission actuator transforms the same into a force having a second principal force component, the direction of which is different from the first force component, which guarantees tilting of the cradle and thereby also the roller in relation to the stand. The transmission actuator is built-in into a space between the roller and a base part of the stand.

13 Claims, 4 Drawing Sheets

U.S. PATENT DOCUMENTS

Figure 1:
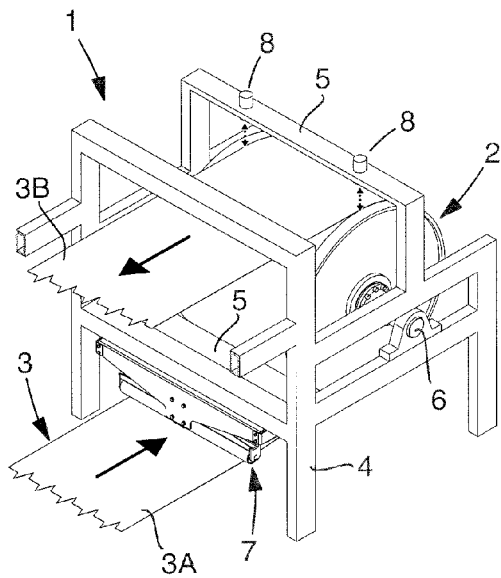

| | | | |
|---|---|---|---|
| 3,543,597 A | | 12/1970 | De Schamphelaere et al. |
| 3,693,781 A | | 9/1972 | Homeier |
| 3,715,027 A | | 2/1973 | Fujimoto |
| 4,170,175 A | * | 10/1979 | Conlon, Jr. .................... 346/74.2 |
| 4,174,171 A | * | 11/1979 | Hamaker et al. ............... 399/165 |
| 4,527,686 A | * | 7/1985 | Satoh ............................ 198/807 |
| 5,365,321 A | * | 11/1994 | Koshimizu et al. ........... 399/329 |
| 5,659,851 A | * | 8/1997 | Moe et al. ..................... 399/165 |
| 6,195,518 B1 | * | 2/2001 | Bennett et al. ................. 399/165 |
| 6,457,709 B1 | * | 10/2002 | Madsen et al. ................. 271/275 |
| 6,843,444 B2 | * | 1/2005 | Wood .......................... 242/534.1 |
| 7,267,255 B1 | * | 9/2007 | Young et al. ..................... 226/15 |
| 7,770,719 B2 | * | 8/2010 | Enenkel et al. ............... 198/806 |
| 7,806,253 B2 | * | 10/2010 | Graswinckel et al. ......... 198/806 |
| 7,866,462 B2 | * | 1/2011 | DeMong .................. 198/810.04 |
| 8,078,092 B2 | * | 12/2011 | Barton et al. .................. 399/329 |
| 8,260,128 B1 | * | 9/2012 | Sturm et al. ..................... 396/27 |

FOREIGN PATENT DOCUMENTS

| | | |
|---|---|---|
| FR | 2586235 | 2/1987 |
| WO | 97/06081 | 2/1997 |

OTHER PUBLICATIONS

Written Opinion dated Sep. 2, 2009 for International Application No. PCT/SE2009/000266 filed May 20, 2009.

* cited by examiner

ADJUSTMENT DEVICE FOR THE ADJUSTMENT OF BELTS OF BELT CONVEYORS

CROSS REFERENCE TO RELATED APPLICATIONS

This application is the National Stage of International Application No. PCT/SE2009/000266, filed May 20, 2009, and claims priority under 35 U.S.C. §119 and/or §365 of Swedish Application No. 801172-8, filed May 21, 2008.

TECHNICAL FIELD OF THE INVENTION

This invention relates to an adjustment device intended for the adjustment of belts of belt conveyors and of the type that comprises a roller that is rotatable around a first axis and mounted in a cradle, which in turn is turnably mounted in a supporting stand, and, by means of a force generator, tiltable in relation to the stand around a second axis extending perpendicularly to the first one.

BACKGROUND OF THE INVENTION AND PRIOR ART

Within the industry, there are used many kinds of belt conveyors of the type that comprises an endless belt as well as a plurality of rollers, at least one of which consists of a drive roller, another of a tension roller, and the other ones of a varying number of deflection rollers. Within many processing industries, e.g., for the preparation and processing of food, belt conveyors are found, the belts of which consist of steel and therefore have good properties in respect of strength, service life and hygiene. However, in such conveyors, at times problems arise so far that the belt may tend to be displaced laterally in relation to certain rollers, which should be passed, and thereby deviate from the ideal path in which the belt reliably is centred in relation to the rollers. This phenomenon may in particular arise when the belt should run around a tension or drive roller at one end of the conveyor. Such displacement tendencies may, among other things, arise as a consequence of uneven load on the belt, but also for other reasons.

In order to manage the above-mentioned problems, adjustment devices of the type initially mentioned are used since long, viz. a roller that is rotatably mounted in a cradle and tiltable by means of a force generator that brings the cradle to be turned in relation to the stand around an axis extending perpendicularly to the rotation axis of the roller. The rollers of such adjustment devices are commonly denominated "tilt rollers" by those skilled in the art. By fitting such a tilt roller upstream the drive or tension roller, which should be passed by the belt, and let the tilt roller co-operate with sensors that detect the centring of the belt, the path of the belt can be corrected by means of readjustment of the tilt roller in a suitable direction and angle in relation to the belt path.

However, a disadvantage of previously known adjustment devices, which are fitted to the frame work carrying the belt conveyor in its entirety, and which are located either above or below the belt, is that the force generators occupy an obstructively large space in and around the frame work. Thus, in previously known belt conveyors, vertically fitted piston-cylinder mechanisms are used, which are pivotally connected with the two opposite ends of the cradle and have the purpose of lowering and raising, respectively, the same depending on the desired setting angle and setting direction of the tilt roller. When the tilt roller of the adjustment device is fitted for actuation of the upper part of the belt, said piston-cylinder mechanisms will protrude upward fairly high from the frame work of the conveyor. If the tilt roller is, on the other hand, fitted for actuation of the lower part of the belt, the mechanisms occupy space inside the frame work, whereby the machine construction in its entirety becomes complicated.

SUMMARY OF THE INVENTION

The present invention aims at obviating the above-mentioned disadvantages of previously known adjustment devices of the kind in question and at providing an improved adjustment device. Therefore, a primary object of the invention is to provide a compact, space-saving adjustment device, which does not unnecessarily intrude neither on the available space inside the machine construction nor on the premises outside the same. Another object is to provide an adjustment device, the fundamental construction of which easily can be adapted to belts of most varying widths. The invention also aims at providing an adjustment device, the constructive structure of which is simple and allows cost-effective series manufacturing. Still another object is to provide an adjustment device in which the load on the tilt roller is distributed in an even way to the stand.

According to the invention, at least the primary object is attained by the features defined in the characterizing clause of claim 1. Preferred embodiments of the adjustment device according to the invention are further defined in the dependent claims.

BRIEF DESCRIPTION OF THE APPENDED DRAWINGS

Figure 2:
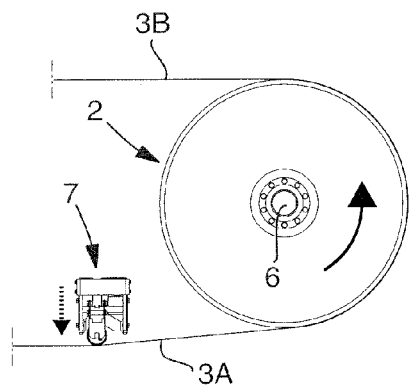
Figure 3:
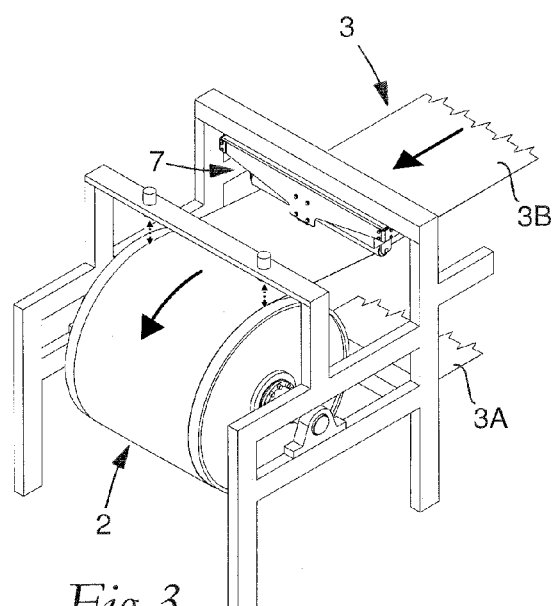
Figure 4:
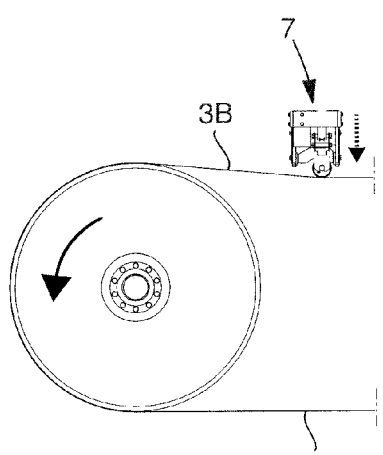
Figure 5:
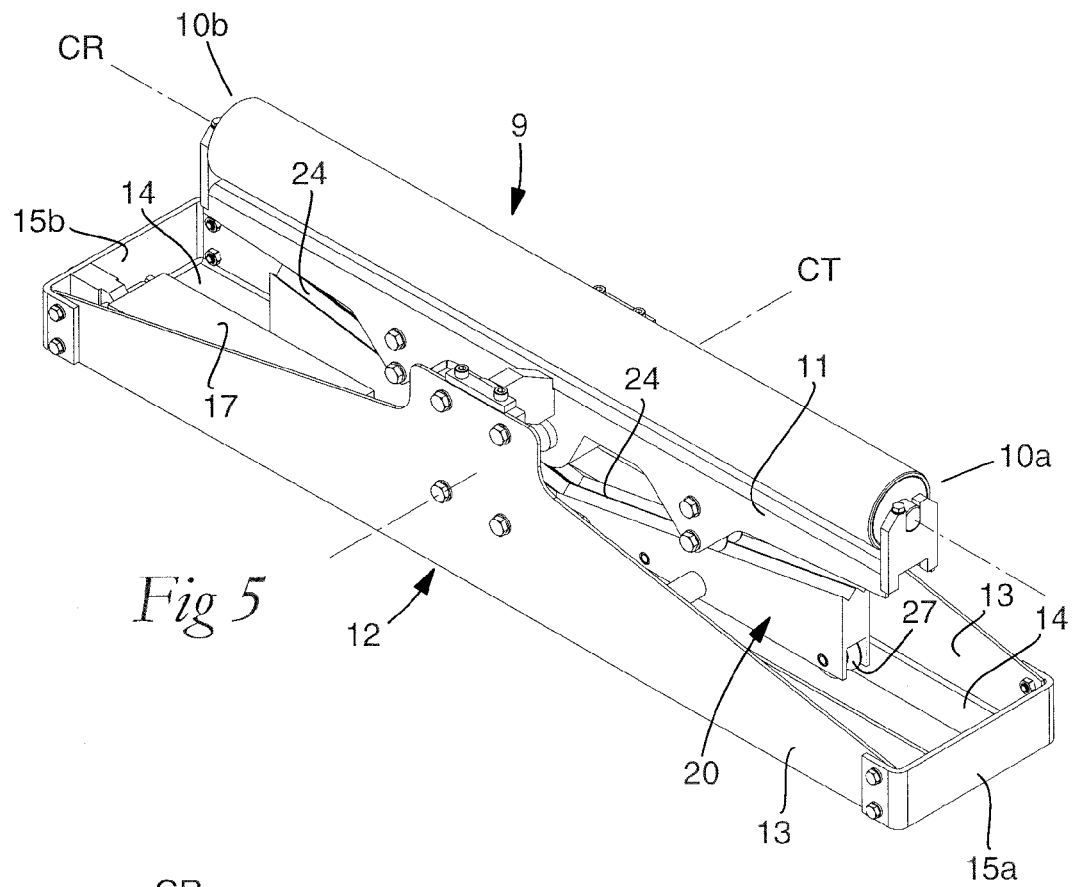
Figure 6:
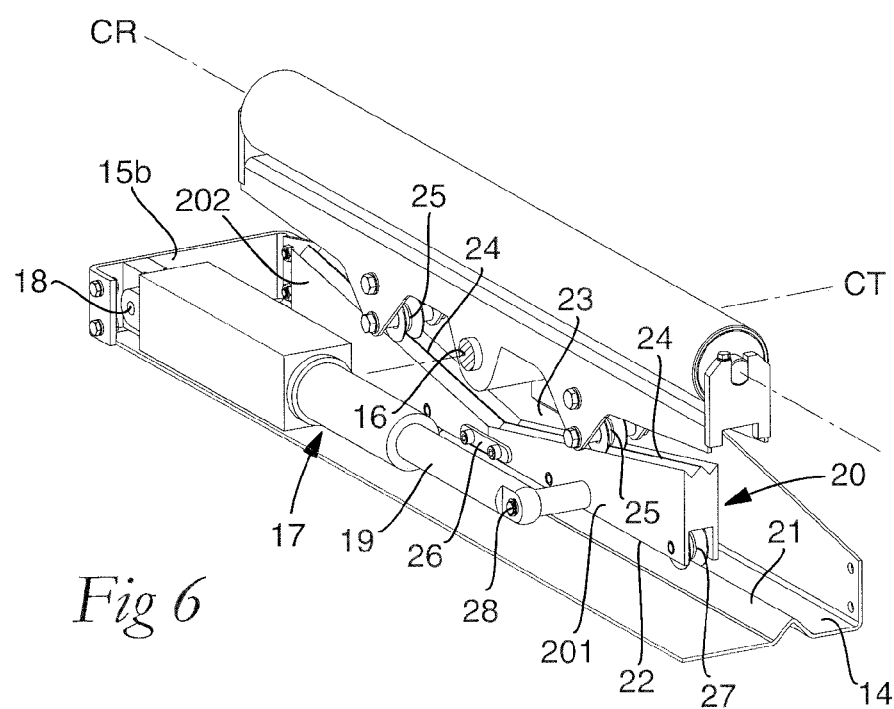
Figure 7:
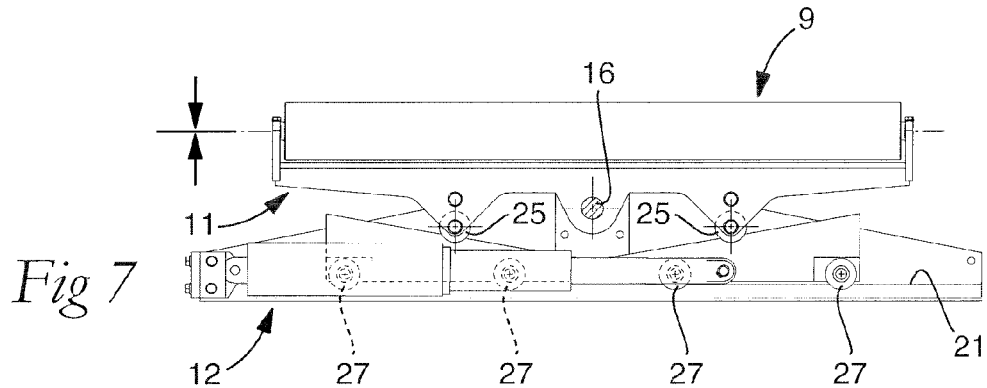
Figure 8:
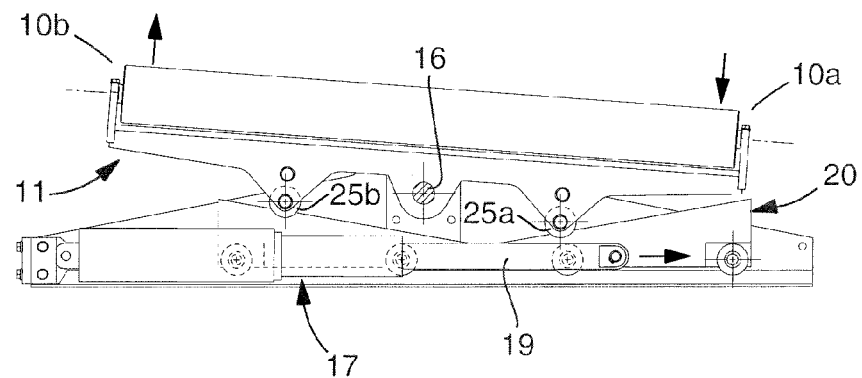
Figure 9:
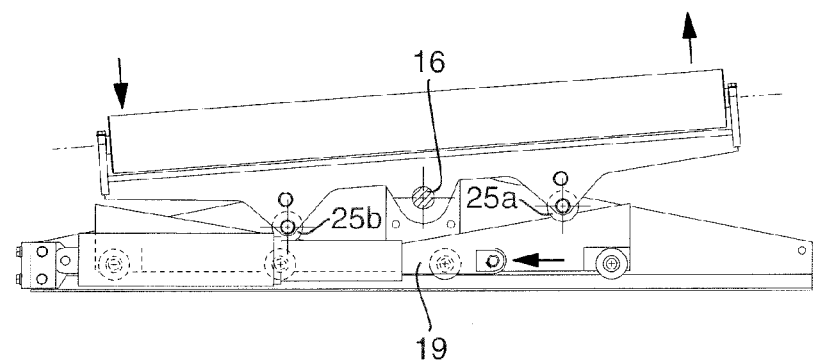
Figure 10:
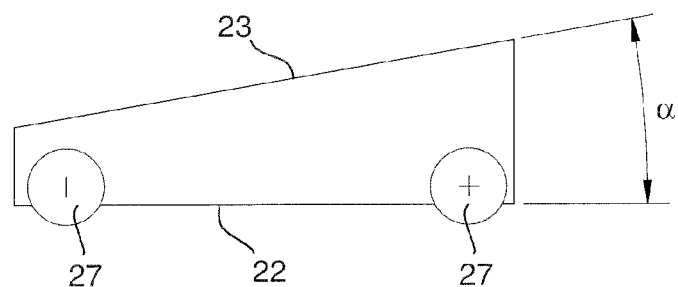
Figure 11:
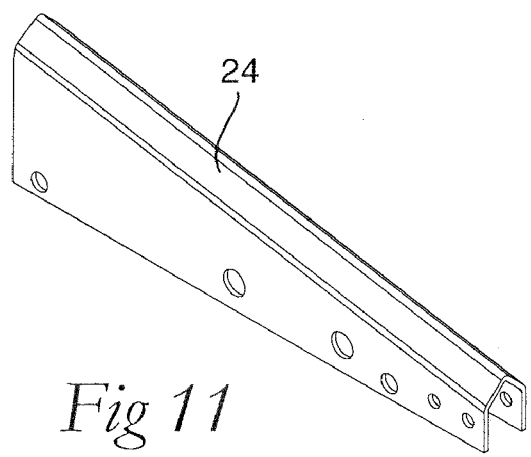
Figure 12:
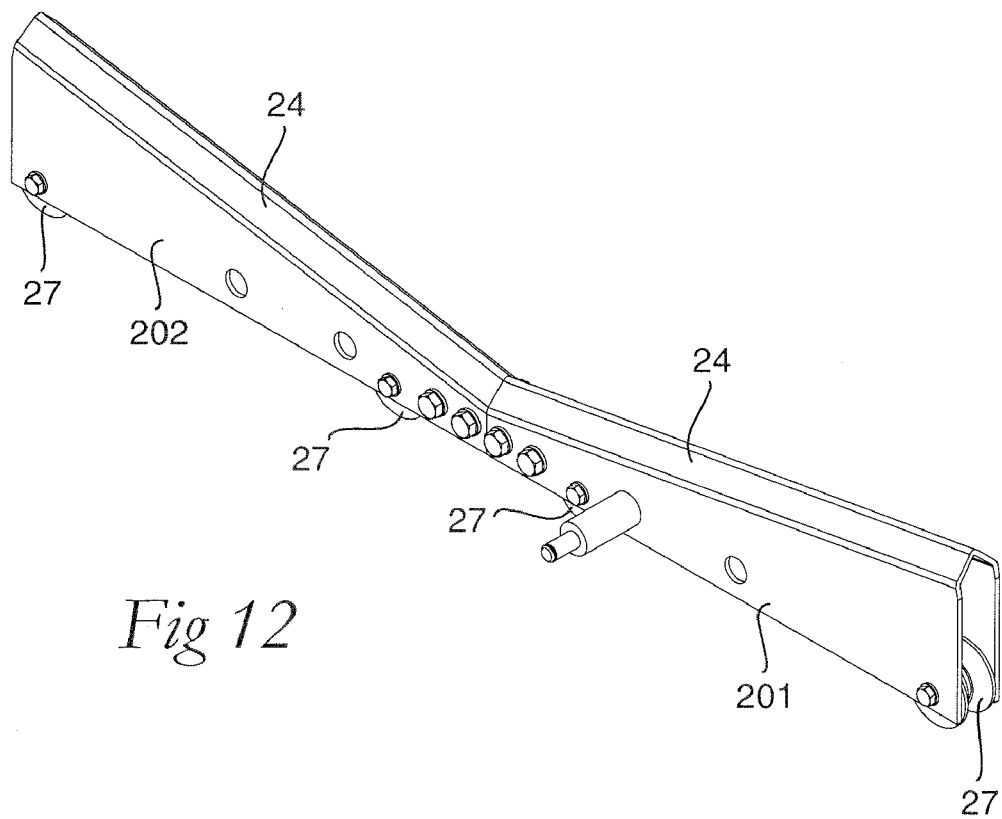

In the drawings:

FIG. 1 is a fragmentary perspective view of a part of a belt conveyor in which an adjustment device made in accordance with the invention is included for the endless belt of the conveyor, FIG. 2 is a schematic side view showing how the adjustment device according to the invention acts against a lower part of the belt, FIGS. 3 and 4 are analogous views illustrating how the adjustment device according to the invention alternatively can act against an upper belt part, FIG. 5 is a perspective view showing a first embodiment of an adjustment device according to the invention, FIG. 6 is a partially cut perspective view of the same adjustment device according to the invention, FIGS. 7-9 are schematic side views showing the tilt roller included in the adjustment device according to the invention in three different settings, FIG. 10 is a side view showing a wedge body included in the adjustment device according to the invention, FIG. 11 is a perspective view showing a wedge body included in the adjustment device according to the invention, and FIG. 12 is a perspective view showing a carriage included in the adjustment device according to the invention.

DETAILED DESCRIPTION OF PREFERRED EMBODIMENTS OF THE INVENTION

In FIGS. 1 and 2, there are shown parts of a belt conveyor, in which a supporting frame work 1, a roller 2 and an endless belt 3 are included, which in this case is kept tightened by the roller 2. In the frame work 1, in addition to a number of supporting uprights 4, also a number of uniting cross-bars 5 are included. The roller 2, which in the example is in the form of a cylindrical drum, includes a central shaft 6, which is rotatably mounted in the surrounding frame work. In the example, the lower part 3A of the belt 3 runs inward toward the roller 2, while the upper part 3B runs out from the same. In this case, an adjustment device according to the invention, in its entirety designated 7, co-operates with the lower, incoming belt part 3A. It should also be noted that at least two sensors 8 are fitted to the frame work in order to detect the position of the belt 3 laterally along the envelope surface of the roller. Said sensors co-operate in a conventional way with a force generator (described in more detail below) included in the adjustment device 7.

In the example according to FIGS. 3 and 4, the upper part 3B of the belt 3 runs in onto the roller 2, while the lower part 3A runs out from the same. Also in this case, the adjustment device 7 co-operates with the incoming belt part, but since this consists of the upper belt part 3B, the adjustment device 7 is here fitted to a cross-bar 5 positioned above the belt in order to act against the upperside of the upper belt part 3B.

Reference is now made to FIGS. 5-12, which illustrate an embodiment of the invention. In the shown adjustment device, a roller 9 is included in the form of a so-called tilt roller, which is rotatable around a first axis CR, more precisely by being rotatably mounted, at the two opposite ends 10a, 10b thereof, in a cradle in its entirety designated 11. Said cradle 11 is in turn turnable or tiltable in relation to a stand generally designated 12, more precisely around a second axis CT extending perpendicularly to the axis CR. The length and diameter of the roller 9 may in practice vary most considerably, however on condition that the length is greater than the diameter. In the example, the length is approx. 10 times greater than the diameter.

In the embodiment shown, the stand 12 includes two side pieces 13 and a base or bottom part 14 extending between the same. At the two opposite ends thereof, the stand includes furthermore two end pieces 15a, 15b, which together with the base and the side pieces form a trough-like construction. The cradle 11 is carried by a shaft or journal 16, which defines the axis CT, and extends between the side pieces 13 and is mounted in relation to these (alternatively, the shaft journal could be fixed to the side pieces at the same time as the cradle is mounted in relation to the shaft). In addition, a force generator 17, providing external energy for tilting of the cradle, is included. The shaft or journal 16 defining the axis CT has a play of less than 1 mm in the direction perpendicular to the axis CR in order to allow the cradle to tilt relatively the stand without introducing tensions in the adjustment device due to the tilting as such.

In the following description, certain spatial concepts will be used, such as "upper" and "lower", respectively. However, these concepts only relate to the drawing FIGS. 5-12, and have no relevance for the real location of the adjustment device in the complete belt conveyor (cf. FIGS. 1-4).

The adjustment device according to the invention allows the use of only one force generator, which in the example consists of a ball or acme screw having a long narrow shape, and which is fitted to the lower, trough-like part of the stand 12, and at one end thereof connected with an end piece 15b, more precisely via a hinge 18. In accordance with the invention, the linearly movable part of the mechanism, viz. the rod 19, is arranged to co-operate with a transmission actuator, in the form of a carriage 20, which, when a force having a principal first force component of a first direction in a line with the rod 19 is generated, transforms the same into a force having a second principal force component of a second direction, different from the first direction, which guarantees tilting of the cradle 11 and thereby also the roller 9 in relation to the stand.

The carriage 20 is, as shown in FIGS. 5-10, movable to and fro along a slide 21 included in the stand. The slide 21 can be either an integrated part of the stand or alternatively a member attached to the stand. In said carriage, an underside 22 and an upperside 23 are included in which a guide element 24 is arranged, which is inclined at an acute angle to the underside 22. Along said guide element 24, a travelling member in the form of a rotatable pulley 25 and connected with the cradle 11 is movable to and fro in order to either be raised or be lowered in relation to the stand when the carriage 20 is moved rectilinearly along the slide 21 and thereby tilt the cradle.

In the shown embodiment, the carriage 20 is composed of two wedge bodies or parts 201, 202, which are interconnected via a coupler 26, which in this case comprises a flat iron fastened with screws in the wedge bodies. By the fact that the carriage in this embodiment includes two parts 201, 202, which individually include an inclined guide element 24, the two guide elements will form an upwardly diverging V-formation, in which the same slope inward/downward toward the centre of the carriage.

In this case, the individual pulley 25 is formed with two flanges that are arranged on both sides of a central waist and run along the individual guide element 24. In the example, the individual guide element 24 is cross-sectionally wedge-shaped, the flanges of the pulley 25 being in the form of conical treads, which diverge in the direction outward from the waist. On the underside thereof, the carriage 20 includes at least two carriage wheels 27, which like the pulleys 25 may include a pair of conical and outwardly diverging treads. In the example, each one of the two wedge bodies 201, 202 include a pair of such carriage wheels 27 (from which it follows that the carriage 20 in its entirety is carried by four carriage wheels). Said carriage wheels are movable along the slide 21 that, in the shown preferred embodiment, is a part of the proper stand 12. More precisely, the slide 21 is a V-shaped bent portion of a sheet-metal plate, which, in addition to the base 14, includes two portions that are bent perpendicularly to the base and form the side pieces 13. The end pieces 15a, 15b consist of U-shaped sheet-metal plates, which are fastened with screws to the ends of the side pieces 13. It should also be pointed out that the movable rod 19 is connected with the carriage 20 via a hinge 28 on a journal protruding from the carriage.

In FIG. 7, the tilt roller 9 is shown set in a horizontal neutral position, in which the two pulleys 25 of the cradle are situated on one and the same level and at equally large distances from the centre of the carriage. This position is assumed as long as the belt 3 is running in a correct, centred way over the roller 2. In other words, the tilt roller is passive in this state.

However, if the belt 3 would tend to be displaced laterally in either direction in relation to the roller 2, the tilt roller is activated by the sensors 8. Thus, in FIG. 8, it is shown how the force generator 17 via the rod 19 has displaced the carriage 20 to the right in the drawing. In this connection, the pulley 25a positioned closest to the end 10a of the tilt roller 9 will fall down along one of the guide elements 24 of the carriage at the same time as the other pulley 25b correspondingly moves upward along the second, co-operating guide element 24. In such a way, the cradle 11 is turned in the clockwise direction around the shaft 16. As soon as the piston rod 19 is stopped in a given position, the cradle 11 is compulsorily kept fixed in the position in question, because the shaft 16 is fixed in relation to the stand 13 at the same time as the two pulleys 25 are kept pressed against the guide elements 24 by the wedge action that arises as a consequence of the wedge-shape of the two wedge bodies 201, 202. By pulling the piston rod 19 into the appurtenant cylinder, the cradle 11 is brought to turn counter-clockwise around the shaft 16, as is seen in FIG. 9. In this state, the pulley 25b has fell down along the appurtenant guide element, while the pulley 25a to a corresponding extent has moved upward along its guide element.

The selection of turning direction is determined by the direction in which the belt tends to be displaced laterally in relation to the rollers of the belt conveyor, more precisely in such a way that the tilt roller is brought to press against the edge of the belt that aims to retreat from the centre of the roller.

The acute angle or wedge angle α (see FIG. 10), which is formed between the upperside and underside 22, 23 of the individual wedge body, amounts in the example to approx. 10°. This angle α may of course vary, but should not be more than 20°, and not be less than 3°. Preferably, the angle is within the range of 8-13°.

In a preferred embodiment, the individual wedge bodies 201, 202 composing the carriage 20 are hollow bodies. The upper part of the wedge body forming the guide element 24 has, in a plane perpendicular to the direction of motion of the carriage 20, a V-shaped cross-section with downwards extending parts forming the walls of the hollow wedge body as shown in FIG. 11. Preferably, the wedge body 201, 202 is composed of a bent sheet-metal plate. As is shown in FIG. 12, the carriage 20 may thus be composed of two such hollow wedge bodies, interconnected via a coupler 26. The coupler 26 can be placed either inside or outside the hollow wedge bodies. The carriage wheels 27 are preferably mounted on the inside of the hollow wedge body.

An advantage of the adjustment device according to the invention is that the same can be realized in a compact design without any vertically protruding components requiring space in the surroundings of the adjustment device, in particular above or underneath the ends of the cradle. By, in the described way, using a transmission actuator for the conversion of a linear force into a force having a force component that can tilt the tilt roller, the requisite force generator can be built into the space between the tilt roller and the base of the supporting stand, i.e., on a level between the same, the force generator advantageously being placed essentially parallel to the length extension of the tilt roller. With particular advantage, the force generator as well as the transmission actuator are placed in the space delimited, on one hand, between the tilt roller and a stand base, and on the other hand between two spaced-apart side pieces of the stand. In the embodiment according to FIGS. 5-12, the carriage is slender, the force generator being placed between the carriage and one of the two side pieces of the stand, more precisely in the immediate vicinity of the base of the stand. A particular advantage of the embodiment according to FIGS. 5-12 is that the same can be realized for tilt rollers having a most varying length and capacity. Thus, the two wedge bodies, which together form a carriage, can be connected with each other via couplers of different length. In other words, the wedge bodies can be manufactured in a standard design and be used for differently long tilt rollers only by the simple measure of varying the length of the coupler. Another advantage of the embodiment according to FIGS. 5-12 is that the load from the tilt roller 9 is distributed in three support points 25-16-25 to the carriage 20 and from the same to the base of the stand 12 via four additional support points in the form of the carriage wheels 27, thus allowing for a stable and light-weight construction. An additional advantage of the embodiment according to FIGS. 11-12, wherein the carriage is composed of two wedge bodies made from a bent sheet-metal plate, is that it allows for a cost-effective series manufacturing of the adjustment device.

The invention is not limited only to the embodiments described above and shown in the drawings. Thus, the travelling members 25 connected with the cradle 11 and movable to and fro along the guide element 24 arranged in the carriage 20 do not necessarily consist of rotatable pulleys. Other examples of suitable travelling members are ball bearings or slide bearings, such as one or more shoes following a rail-shaped guide element arranged in the carriage 20. Correspondingly, the carriage wheels 27 could also be ball bearings or slide bearings. The slide 21, along which the carriage 20 is movable, is not necessarily a V-shaped bent portion of a sheet-metal plate which also includes the base 14 of the stand 12. Alternatively, the slide 21 may e.g. be welded or screwed onto the base 14.

Furthermore, the requisite force generator may be realized in other ways than in the form of long narrow mechanisms acting in the longitudinal direction of the tilt roller 9 and cradle 11. It is also possible to fit the force generator so that it applies a force to the transmission actuator in another direction than parallel to the cradle. Moreover, the proper force generator may be placed in the extension of the stand 12—on a level between the tilt roller 9 and the base of the stand—and be connected with the carriage 20, e.g. via a drawbar. Furthermore, the cradle 11 may carry more than one roller 9, either arranged in a row along the axis CR, or consecutively in respect of the long direction of the belt 3. In the latter case, each tilt roller 9 has an individual axis CR. Also combinations of said two variants are feasible in certain applications.

The invention claimed is:

1. Adjustment device for the adjustment of belts of belt conveyors, comprising a roller that is rotatable around a first axis (CR) and mounted in a cradle, which in turn is turnably mounted in a supporting stand, and, by a force generator, tiltable in relation to the stand around a second axis (CT) extending perpendicularly to the first axis (CR), wherein the adjustment device comprises a transmission actuator co-operating with the force generator, which, when the force generator generates a force having a principal first force component of a first direction, transforms into a force having a second principal force component of a second direction, which guarantees tilting of the cradle and thereby also the roller in relation to the stand, the transmission actuator being built-in into a space between the roller and a base part of the stand, the transmission actuator consisting of a carriage movable to and fro along a slide, which carriage comprises an underside and an upperside having two guide elements, which are each inclined at an acute angle (α) to the underside and which guide elements slope in different directions in relation to the underside and along which guide elements travelling members connected with the cradle and spaced apart laterally from the second axis (CT) are movable to and fro, and that the carriage is rectilinearly movable along said slide in order to—depending on the direction of motion—either raise or lower the travelling members and thereby turn or tilt the cradle in either direction around said second axis (CT).

2. Adjustment device according to claim 1, wherein the travelling member consists of a rotatable pulley.

3. Adjustment device according to claim 2, wherein the pulley comprises two flanges that are arranged on both sides of a central waist and have the purpose of running along the guide element arranged on the upperside of the carriage.

4. Adjustment device according to claim 3, wherein the guide element is cross-sectionally wedge-shaped and that the flanges of the pulley include conical treads, which diverge in the direction outward from the waist.

5. Adjustment device according to claim 1, wherein the carriage comprises two spaced-apart carriage wheels rotatably fitted along the underside and abutting against a slide.

6. Adjustment device according to claim 5, wherein the slide is straight.

7. Adjustment device according to claim 6, wherein the stand, in addition to two spaced-apart side pieces between which the cradle is hinged, comprises a base in the form of a sheet-metal plate in which a cross-sectionally V-shaped bending is formed, which forms said slide.

8. Adjustment device according to claim 5, wherein the stand, in addition to two spaced-apart side pieces between which the cradle is hinged, comprises a base in the form of a sheet-metal plate in which a cross-sectionally V-shaped bending is formed, which forms said slide.

9. Adjustment device according to claim 1, wherein the individual guide element slopes in the direction upward/outward from a central part of the carriage.

10. Adjustment device according to claim 1, wherein the guide elements are included in two separate wedge bodies, which are interconnected via a coupler while forming a continuous carriage.

11. Adjustment device according to claim 10, wherein each wedge body is composed of a bent sheet-metal plate.

12. Adjustment device according to claim 1, wherein the force generator consists of a long narrow mechanism of variable length, one end of which is connected with the stand and the opposite end of which is connected with the carriage.

13. Adjustment device according to claim 12, wherein the force generator consists of a piston-cylinder mechanism.

\* \* \* \* \*